US009777507B2

(12) United States Patent
Walter (10) Patent No.: US 9,777,507 B2
(45) Date of Patent: Oct. 3, 2017

(54) FLAME RESISTANT INSULATED FABRIC FOR SHELTERS (71) Applicant: CLAM CORPORATION, Rogers, MN (US)

(72) Inventor: Thomas A. Walter, Cologne, MN (US)

(73) Assignee: Clam Corporation, Rogers, MN (US)

( * ) Notice: Subject to any disclaimer, the term of this patent is extended or adjusted under 35 U.S.C. 154(b) by 0 days.

(21) Appl. No.: 15/042,827

(22) Filed: Feb. 12, 2016

(65) Prior Publication Data
US 2017/0234029 A1 Aug. 17, 2017

(51) Int. Cl.
E04H 15/54 (2006.01)
E04H 15/58 (2006.01)
E04H 15/32 (2006.01)
E04H 15/48 (2006.01)
E04H 15/62 (2006.01)
B32B 37/12 (2006.01)
B32B 37/14 (2006.01)

(52) U.S. Cl.
CPC ............ E04H 15/54 (2013.01); B32B 37/12 (2013.01); B32B 37/14 (2013.01); E04H 15/322 (2013.01); E04H 15/48 (2013.01); E04H 15/58 (2013.01); E04H 15/62 (2013.01); B32B 2307/3065 (2013.01)

(58) Field of Classification Search
CPC .. E04H 15/54; B23B 37/14; B23B 2307/3065
USPC .................................................. 135/115, 147
See application file for complete search history.

(56) References Cited

U.S. PATENT DOCUMENTS

| 4,500,592 | A | * | 2/1985 | Lee | B32B 27/12 428/102 |
| 4,705,717 | A | * | 11/1987 | Cain | B32B 7/02 135/87 |
| 4,927,705 | A | * | 5/1990 | Syme | B32B 27/12 428/192 |
| 4,956,218 | A | * | 9/1990 | Haining | A62C 8/06 169/50 |
| 5,490,567 | A | * | 2/1996 | Speer | A62C 8/06 169/50 |
| 5,630,296 | A | * | 5/1997 | Kendall, Jr. | A62B 17/00 135/128 |
| 6,253,777 | B1 | * | 7/2001 | Anderson | E04H 15/54 135/115 |
| 7,128,207 | B2 | * | 10/2006 | Anderson | B32B 7/08 135/126 |
| 7,131,236 | B2 | * | 11/2006 | Sample | E04H 1/1277 135/131 |
| 7,882,849 | B2 | * | 2/2011 | Franta | E04H 15/001 135/115 |

(Continued)

Primary Examiner — Noah C Hawk
(74) Attorney, Agent, or Firm — Cook Alex Ltd.

(57) ABSTRACT

A shelter including an enclosure having a plurality of interconnected side walls defining a floor space and being connected to a top wall, with at least one of the side walls or the top wall including a panel construction comprising a flame resistant insulated fabric, the flame resistant insulated fabric including a flame resistant outer layer, a flame resistant inner layer, an insulating middle layer disposed between and adhesively bonded to the flame resistant outer layer and the flame resistant inner layer. Also disclosed is a method of making a shelter including forming the flame resistant insulated fabric.

19 Claims, 4 Drawing Sheets (56) References Cited

U.S. PATENT DOCUMENTS

| | | | | |
|---|---|---|---|---|
| 2002/0139407 A1* | 10/2002 | Spiteri | ............... | A62C 3/00 |
| | | | | 135/97 |
| 2010/0288321 A1* | 11/2010 | Dwyer | ............... | E04H 15/54 |
| | | | | 135/115 |
| 2011/0094555 A1* | 4/2011 | Franta | ............... | E04H 15/001 |
| | | | | 135/143 |
| 2013/0074894 A1* | 3/2013 | Cook | ............... | E04H 15/54 |
| | | | | 135/96 |
| 2014/0060599 A1* | 3/2014 | Hotes | ............... | E04H 15/36 |
| | | | | 135/91 |

* cited by examiner

FLAME RESISTANT INSULATED FABRIC FOR SHELTERS

BACKGROUND OF THE INVENTION

Field of the Invention

The present invention generally relates to fabrics for shelters, and more particularly to flame resistant insulated fabrics for shelters.

Discussion of the Prior Art

Portable shelters, such as may be used for ice fishing, are known and typically include a lightweight flexible enclosure supported by a collapsible frame. While many constructions exist, the flexible enclosure often has multiple side walls, with each side wall connected to adjacent side walls and to a top wall. When the collapsible frame is erected, the enclosure is free standing. Such portable shelters generally are sized to accommodate one or two individuals and their gear, but they certainly may be of larger construction.

The side walls and top wall may be constructed using various sheet materials when forming broad panels, including fabrics, such as canvas, polyester or nylon. Harsh weather conditions to which a shelter may be subjected can present challenges to the durability of the shelter and to the safety and comfort of its users. The shelters may be subjected to very cold temperatures, rain or water, snow, sun, high winds, and in some instances may be subjected to extreme heat or even be located in the close vicinity of a source of fire. Such conditions have led to the development of composite panels, which generally also will be referred to herein as being "fabrics."

Thus, more modern fabrics have been constructed to be flame resistant and/or to include some form of insulation, so as to improve the safety and comfort available to shelter users. However, such fabrics typically utilize a quilted construction, with patterned stitching lines across the broad surfaces of the panels, which can be problematic. The stitching lines tend to provide a passage for light, exterior or interior air, and moisture. Thus, in when in very cold exterior temperatures, frost may form along the exterior and interior of the stitching lines on the side walls and top wall. As the interior of the enclosure warms, the frost throughout the interior along the stitching lines tends to melt and drip, which is undesirable.

In addition, some ice fishing anglers choose to "sight fish" and/or spear fish, both of which require a very dark environment to be able to see down into the depths of the water. The light intrusion or leakage at the stitching lines of prior art insulated fabrics tends to provide bothersome ambient light that impedes the ability to fish in this manner. On the other hand, to avoid such stitching lines users have had to use shelters having a single layer fabric, which results in an undesirable lack of thermal insulation and reduced comfort.

SUMMARY OF THE INVENTION

The purpose and advantages of the invention will be set forth in and apparent from the description and drawings that follow, as well as will be learned by practice of the claimed subject matter.

This disclosure generally provides flame resistant insulated fabrics for shelters, which retain the qualities of compactness, light weight and easy set-up of portable shelters, yet have unique, desirable advantages. The fabrics of the present disclosure feature a construction that includes multiple layers, which collectively provide flame resistance and insulation properties, but do so without the undesirable stitching lines formed when using a quilted construction. Thus, the fabric panels of shelters of the present construction avoid having stitching lines across the broad surfaces of the panels that are common and necessary in quilted construction, and thereby reduce unwanted air exchange, condensation, dripping and light leakage. This results in a flame resistant, insulated, shelter that advantageously provides users a more comfortable, dryer and darker interior environment. The fabrics may incorporate darkened coatings for adding color or for further light-proofing and/or coatings that make the fabric stronger, keep the fibers together, and make the fabric flame resistant, waterproof or water resistant, cold crack resistant, scratch, stain and/or mold resistant. Such fabrics advantageously may be used in constructing shelters, whether of a more permanent or portable nature, as well as other apparatus, such as wind breaks or blinds.

In a first aspect, this disclosure provides a shelter comprising an enclosure having a plurality of interconnected side walls defining a floor space and being connected to a top wall, with at least one of the side walls or the top wall including a panel construction comprising a flame resistant insulated fabric, wherein the flame resistant insulated fabric comprises a flame resistant outer layer, a flame resistant inner layer, and an insulating middle layer disposed between and adhesively bonded to the flame resistant outer layer and the flame resistant inner layer.

In another aspect, this disclosure provides a method of making a shelter comprising the steps of providing a flame resistant outer layer, providing a flame resistant inner layer, and forming a flame resistant insulated fabric by providing and positioning an insulating middle layer between and adhesively bonding the insulating middle layer to the flame resistant outer layer and the flame resistant inner layer. The method further comprises the steps of forming the flame resistant insulated fabric into panels, forming a plurality of side walls and a top wall, each of which comprises at least one of the flame resistant insulated fabric panels, and interconnecting the plurality of side walls and the top wall so as to define an enclosure.

As above noted, the example flame resistant insulated fabric for shelters, example shelters made with such fabric and example methods of making a shelter of this disclosure provide several advantageous features. The example fabric, shelters and methods of making a shelter provide the ability to make and use shelters that have an enclosure that is insulated and does not have quilted stitching lines across broad areas of the side walls and top wall. This results in a shelter that may have one or more side walls and/or top wall that includes the properties of being flame resistant and insulated, resulting in a more comfortable, dryer and darker interior environment. These attributes also are available in a shelter that can be quickly and conveniently set up by utilizing a collapsible frame, such as in the form of a pop up structure. This further permits the shelters to be swiftly erected and/or collapsed, without the use of tools.

It is to be understood that both the foregoing general description and the following detailed description are exemplary and provided for purposes of explanation only, and are not restrictive of the subject matter claimed. Further features and objects of the present disclosure will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

It should be understood that the drawings are not to scale. While some mechanical details of example shelters, including other plan and section views of the examples shown and of examples that may have alternative configurations, have not been included, such details are considered well within the comprehension of those of skill in the art in light of the present disclosure. It also should be understood that the present invention is not limited to the example embodiments illustrated.

DETAILED DESCRIPTION OF THE PREFERRED EMBODIMENTS

For the following defined terms, these definitions shall be applied, unless a different definition is given in the claims or elsewhere in this disclosure. As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

Referring generally to FIGS. 1-5, it will be appreciated that flame resistant insulated fabrics for shelters, shelter constructions and methods of making a shelter of the present disclosure generally may be embodied within numerous configurations, and may be used in various ways to alter and enhance the comfort and convenience of users. Indeed, while acknowledging that all of the example configurations of shelters need not be shown herein, examples are provided to better demonstrate that a variety of configurations and methods are contemplated.

Figure 2:
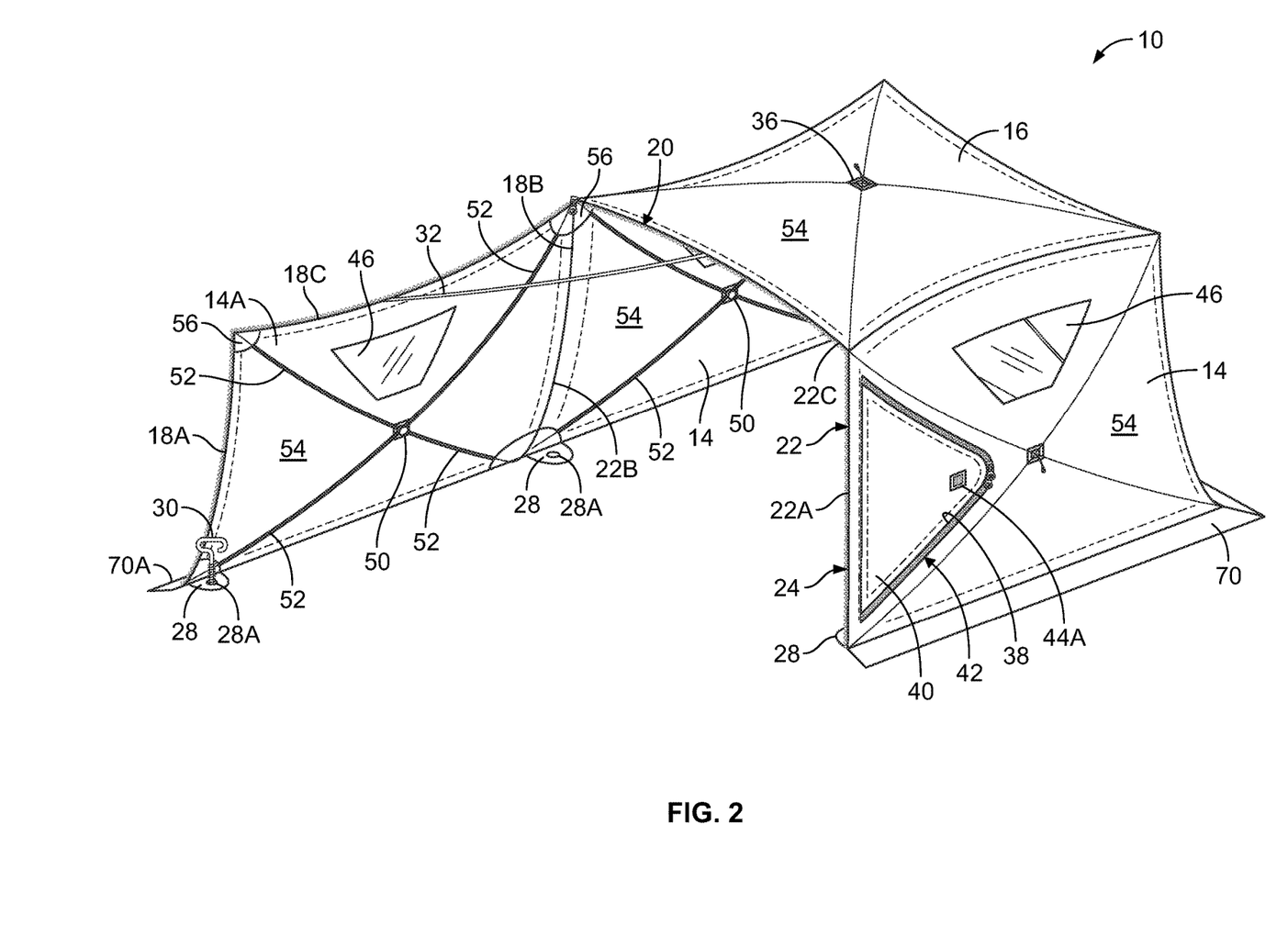
FIG. 2 is a perspective view of the example shelter system of FIG. 1, showing the shelter in an alternative position.
Figure 3:
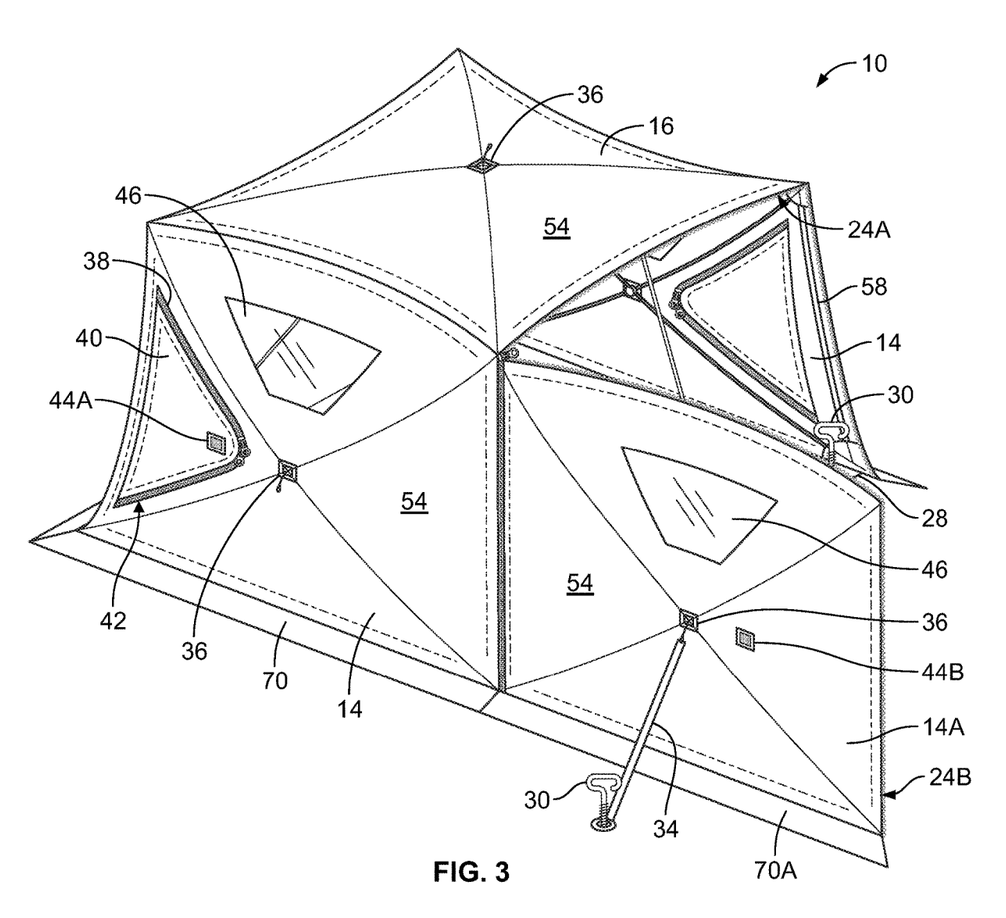
FIG. 3 is a perspective view from a different angle of the example shelter of FIG. 1, in the alternative position shown in FIG. 2.
Figure 4:
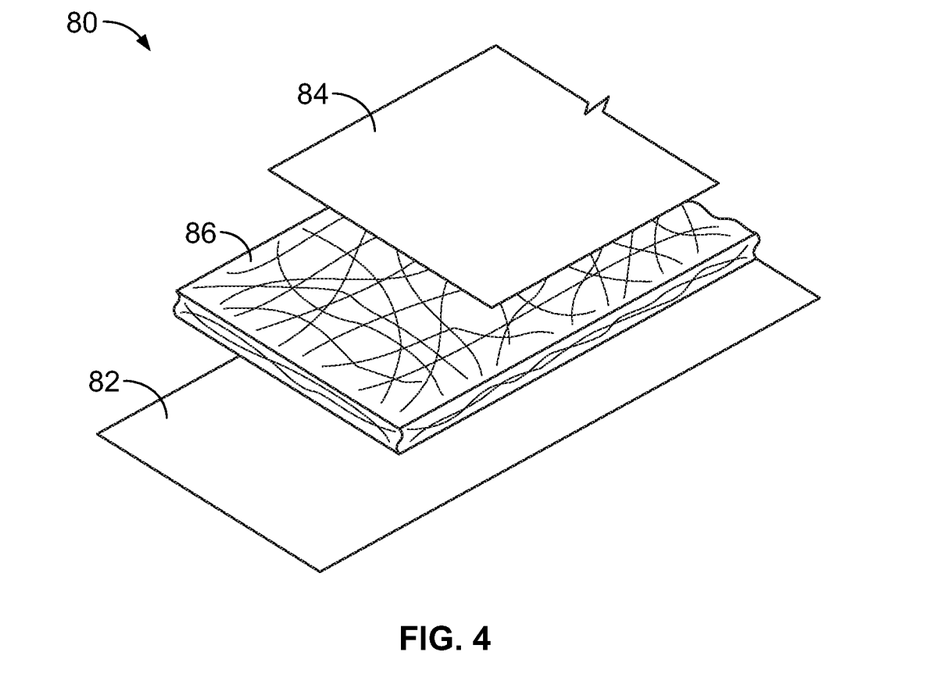
FIG. 4 is a perspective view of the layers of the flame resistant insulated fabric of the present disclosure.
Figure 5:
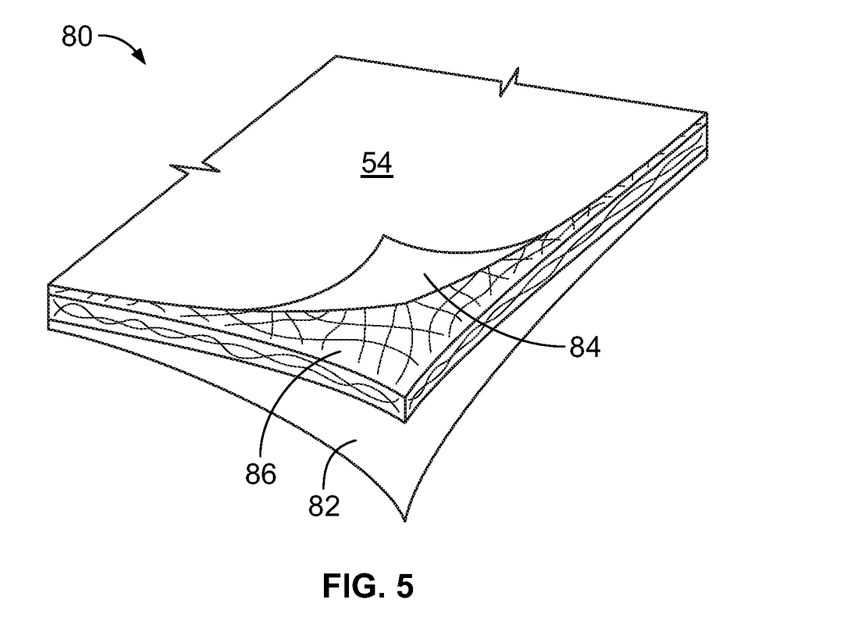
FIG. 5 is a further perspective view of the flame resistant insulated fabric of the present disclosure, with the layers being separated.

Turning to the example embodiment of a shelter shown in FIGS. 1-5, a shelter 10 is shown and generally comprises a portable enclosure 12 that includes a plurality of interconnected side walls defining an open floor space and being connected to a top wall. In this example, the side walls 14 are connected to a side wall 14A that is configured to be removable, while all of the side walls 14, 14A are connected to a top wall 16. Any of the side walls 14, 14A or the top wall 16 may be constructed using a flame resistant insulated fabric, which will be described further herein and is represented in FIGS. 4 and 5.

Figure 1:
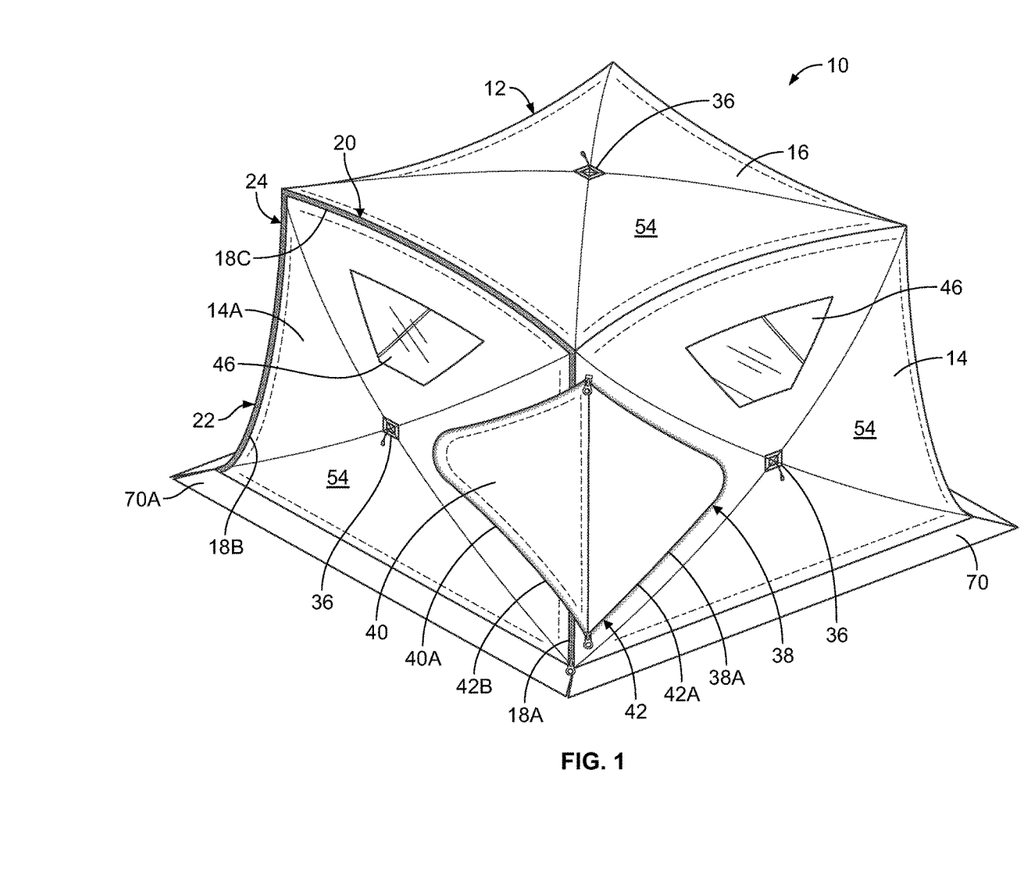
FIG. 1 is a perspective view of an example shelter having a flame resistant insulated fabric of the present disclosure.

In the example shown in FIGS. 1-3, the removable side wall 14A has opposed first and second side edges 18A, 18B and a top edge 18C and defines an opening 20 in the enclosure 12. The opening 20 in the enclosure has a perimeter edge 22, having first and second side edges 22A, 22B and a top edge 22C, which further comprise a connecting member 24. The connecting member 24 is configured to selectively disconnect the removable side wall 14A from the perimeter edge 22 of the opening 20 along the first and second side edges 18A, 18B and the top edge 18C of the removable side wall 14A, or to hinge the removable side wall 14A from the enclosure by disconnecting the removable side wall 14A from the perimeter edge 22 of the opening 20 along the first side edge 18A and the top edge 18C of the removable side wall 14A. When in a hinged open position, such as is shown in FIGS. 2 and 3, the side wall 14A may serve as a wind break.

In this example, the perimeter edge 22 of the opening 20 is shown to be located at the corners from the removable side wall 14A to the adjacent side walls 14 and to the top wall 16. The perimeter edge 22 of the opening 20 could be spaced from the actual corners, but it is desirable to avoid having an intermediate wall, because it would create an obstruction and limit the freedom of movement through the opening 20.

It will be appreciated that the side walls 14 and removable side wall 14A may further include internal anchor straps 28 configured for use in holding a side wall 14 in place, or for holding the removable side wall 14A in a hinged, open position, as shown in FIG. 2. Such internal anchor straps 28 may include a tab of flexible material or fabric having an eyelet 28A through which an anchor 30 may pass downward and into the ground surface. The internal anchor straps 28 may be used adjacent the opening 20 to help anchor the enclosure to the ground surface and to keep the side walls 14 from moving further apart at the ground surface. In an example of use for ice fishing, the anchor 30 may be a threaded spike having a handle, for ease of turning by hand to secure the side walls 14 and/or to secure the removable side wall 14A in a selected hinged open position. This arrangement permits the removable side wall 14A to provide added utility by serving as a wind break, such as when it may be desirable if a user seeks to sit or fish outside of the enclosure, but to be at least partially sheltered from the wind. A hinging limiter 32, such as is shown for example in the form of a removable elongated strap, also may be provided to limit the angle to which the removable side wall 14A may swing to an open position. It will be appreciated that the hinging limiter 32 may be of various alternative constructions and may include a construction that is adjustable in length, such as may be provided by a buckle on the example strap.

In addition, the removable side wall 14A may be steadied and anchored in a hinged open position by an optional external anchor strap 34. Each of the side walls 14, 14A and top wall 16 may be equipped with an external connector 36, which are shown in FIGS. 1-3 at the center of each wall. As shown in FIG. 3, a first end of an external anchor strap 34 may be connected to an external connector 36 at the center of the removable side wall 14A and a second end of the external anchor strap 34 may be staked to the ground using a suitable anchor, such as the anchor 30 previously described, which may extend through and end of the external anchor strap 34.

It will be appreciated that a shelter that utilizes the flame resistant insulated fabric of the present disclosure may not include a side wall that is removable or could be hinged to an open position. Indeed, a shelter may be configured to have all of the side walls permanently interconnected. This is possible because, as shown in FIGS. 1-3, at least one of the side walls 14 in any configuration of an enclosure may include a doorway 38. In this example, the doorway 38 may be closed by a door 40 that is in the form of a flap of material or fabric of a side wall 14, or may include alternative materials that differ from the material of the side walls 14. In this example, the doorway 38 and door 40 are shown as having a connecting member 42 having complementary portions 42A and 42B of a zipper located at their edges to be able to provide a convenient and relatively weather proof closure. It will be appreciated that one or more zippers, or alternative mechanical connecting members, such as hook and loop fasteners, snaps or the like, also could be used to close a door in a side wall 14. Also, fasteners 44 may be used for holding open a door 40. The fasteners 44 may be of any suitable type, such as hook and loop, snaps or other alternatives. Thus, a first fastener portion 44A is shown on the exterior of a door 40, while a second fastener portion 44B is shown on an opposed exterior of a side wall 14, 14A, for removable connection when the door 40 is in a fully opened position.

FIGS. 1-3 also show at least one of the side walls 14, 14A may include a window 46. The window 46 may include a transparent panel and/or screen that is permanently connected to a side wall 14, 14A in a closed position, or may be configured to permit opening. It will be appreciated that additional windows of generally similar construction may be connected to the top wall 16, such as to form a skylight, or that windows may have an alternative construction, such as may be provided by a transparent or non-transparent flap that may be held in an open or closed position.

In this first example convertible shelter system, the connecting member 24 includes two portions, with a first portion 24A attached at the edge 22 of the opening 20 of the enclosure 12 and a second portion 24B attached along the side and top edges 18A, 18B and 18C of the removable side wall 14A. While it may be of a different construction, the connecting member 24 is shown, for example, as including complementary portions of a detachable zipper assembly.

The example enclosure 12 further comprises a pop up structure that supports the side walls and top wall. In the example shown, each side wall 14, 14A and the top wall 16 have a hub 50 that is connected to a plurality of rods 52. The plurality of rods 52 are connected to a fabric panel 54 of the respective side wall or top wall, such as by fitting within a pocket 56 in the corner of the respective panel. In this example, for each of the side walls 14, 14A and the top wall 16, the plurality of rods 52 include four rods 52 that are pivotally connected to the hub 50 and are movable to achieve an erected position that places the fabric panel 54 in tension, such as by pivoting to an over-center position. As seen in FIG. 3, an optional additional rod 58 may be used along the side of the opening 20 in the enclosure 12, if there is a desire for additional vertical support of a side wall 14 at the opening 20. The rods 52 and 54 may be somewhat flexible and may be constructed of suitable materials, such as fiberglass, plastic or metal. It also will be appreciated that alternative collapsible frame structures may be utilized, and that the side walls and top wall each may be comprised of multiple connected fabric panels 54.

The example shelter 10 also is shown with a skirt 70 around the base of the exterior of each of the enclosure 12. For this example enclosure 12, it will be appreciated that a portion 70A of the skirt 70 is connected to the removable side wall 14A, and therefore, is removed when a removable side wall 14A is removed from the rest of the enclosure 12.

Turning to the construction of the fabric of the fabric panels 54, as shown in FIGS. 4 and 5, the fabric 80 comprises a flame resistant outer layer 82, a flame resistant inner layer 84 and an insulating middle layer 86. The insulating middle layer 86 is disposed between and adhesively bonded to the flame resistant outer layer 82 and inner layer 84. Thus, the outer and inner layers 82, 84 are bonded to opposed sides of the middle layer 86, resulting in a permanently bonded final flame resistant insulated fabric 80. In the example shelter 10 of FIGS. 1-3, the fabric 80 is used in the panels 54 of all of the side walls 14, 14A and of the top wall 16. However, it will be appreciated that the flame resistant insulated fabric 80 for shelters may be use in one or more of the side or top walls. Thus, it is contemplated that the fabric 80 would be used in a panel 54 of at least one of the side walls 14, 14A or the top wall 16, with its greatest likely impact being when used at least in the top wall 16. In addition, the bonding of the outer and inner layers 82, 84 to the middle layer 86 may be accomplished in any suitable manner, including for example, by use of a separate hot melt or pressure sensitive adhesive, whether directly applied to the one of the layers, such as by liquid spray or roller, whether applied with or over the PU coating, or provided in the form of a solid film material disposed between the layers and then heat activated. It will be appreciated that the construction of the outer and inner layers 82, 84 need not be similar and that the form of the construction of the outer and inner layers 82, 84 and of the insulating middle layer 86, together with the desired flexibility of the resulting fabric 80 may influence the decision regarding a desired material and method for adhesively bonding together the layers.

In the example shown, the outer layer 82 and inner layer 84 preferably may be constructed of a fabric that is 300 Denier polyester fabric. The fabric of the outer layer 82 may be coated with various coatings, such as a polyurethane (PU) coating that may provide color, for appearance or light-proofing, as well as other advantageous properties, such as to make the fabric stronger, keep the fibers together, and make the fabric flame resistant, waterproof or water resistant, cold crack resistant, scratch, stain and/or mold resistant. It will be appreciated that other synthetic or natural fiber fabric, including other sheet materials, whether coated or uncoated, and in alternative weights or thicknesses, may be used for the outer layer 82 and inner layer 84, that they need not be constructed of the same materials, and so long as the resulting fabric 80 is flame resistant and will meet the U.S. safety regulation CPAI-84 for flame resistant materials in portable shelters, and the Canadian safety regulation SOR-90-245 of the Canada Consumer Product Safety Act.

The outer and inner layers 82, 84 of the present example have a PU coating on the surfaces which will be adjacent and bonded to the middle layer 86. The middle layer 86 of the present example preferably is constructed of a poly fill, such as a synthetic insulation that generally includes polyester threads that have been molded so as to mimic a continuous down-type cluster, and preferably has a grams per metered squared weight of 60 g/m$^2$. The middle layer 86 of insulation may be of various thicknesses and various weights, with the present example preferably starting with a thickness of roughly ⅛" to 3/16", which when pressed and bonded together with the outer and inner layers 82, 84 may result in a flame resistant insulated fabric for shelters having an overall thickness of roughly ⅛" to 3/16". However, it will be appreciated that various polyester or natural fiber alternative insulation materials may be suitable for use and may be of different densities and thicknesses, depending on the desired properties of the finished flame resistant insulated fabric.

In light of the aforementioned description of the example flame resistant insulated fabrics for shelters, it will be appreciated that one may follow a method of making a shelter 10 that is consistent with this disclosure. The method includes the steps of providing a flame resistant outer layer 82, providing a flame resistant inner layer 84, forming a flame resistant insulated fabric by providing and positioning an insulating middle layer 86 between and adhesively bonding the insulating middle layer 86 to the flame resistant outer layer 82 and the flame resistant inner layer 84. The method further includes forming the flame resistant insulated fabric 80 into panels 54, forming a plurality of side walls 14 and/or 14A and a top wall 16, each of which comprises at least one of the flame resistant insulated fabric panels 54, and interconnecting the plurality of side walls 14 and/or 14A and the top wall 16 so as to define an enclosure 12.

The method of making a shelter may further include wherein at least one of the side walls with doorway 38 and/or a window 46. The method of making a shelter also may include wherein the enclosure further includes an anchor strap 28 for use in connecting a side wall 14 and/or 14A to a ground surface. As shown herein, the method may further comprise forming a collapsible structure for each side wall 14 and/or 14A and the top wall 16. This may further include wherein the collapsible structure for at least one of the side walls or the top wall further includes a pop up structure having a hub 50 that is connected to a plurality of rods 52, with the rods being connected to the fabric panel 54 of the at least one of the side walls 14 and/or 14A or the top wall 16. It will be appreciated that the method may further include that the rods 52 are pivotally connected to the hub 50 and are movable to achieve an erected position that places the fabric panel 54 in tension.

From the above disclosure, it will be apparent that flame resistant insulated fabrics for shelters constructed in accordance with this disclosure may include a number of structural aspects that provide numerous advantages over conventional constructions. The example fabrics and shelter constructions shown herein may exhibit one or more of the above-referenced potential advantages, depending upon the specific design chosen.

It will be appreciated that a flame resistant insulated fabric for shelters constructed in accordance with the present disclosure may be provided in various configurations. Any variety of suitable materials of construction, configurations, shapes and sizes for the components and methods of connecting the components of shelters may be utilized to meet the particular needs and requirements of an end user. It is to be understood that the invention is not to be limited to the disclosed example embodiment, but rather, is intended to cover various modifications and equivalent arrangements include within the spirit and scope of the appended claims. Thus, the description and drawings should be considered illustrative and not restrictive of the invention, which is limited only by the appended claims and their legal equivalents.

The invention claimed is:

1. A shelter comprising:
an enclosure having a plurality of interconnected side walls defining a floor space and each side wall being connected at an upper perimeter edge to a top wall;
at least one of the side walls or the top wall including a panel construction comprising a flame resistant insulated non-quilted non-air permeable fabric, the flame resistant insulated non-quilted non-air permeable fabric being assembled without a quilted stitching pattern and comprising:
a non-metal polyester fabric having a polyurethane coating, being flame resistant, water resistant and defining an outer layer;
a non-metal polyester fabric having a polyurethane coating, being flame resistant, water resistant and defining an inner layer; and
a non-metal poly fill insulation middle layer disposed between and adhesively bonded to each of the outer layer and the inner layer.

2. The shelter in accordance with claim 1, wherein the shelter is portable.

3. The shelter in accordance with claim 1, wherein at least one of the side walls further comprises a doorway.

4. The shelter in accordance with claim 1, wherein at least one of the side walls further comprises a window.

5. The shelter in accordance with claim 1, wherein the enclosure further comprises an anchor strap further comprising an eyelet for use with a ground engaging anchor in connecting a side wall to a ground surface.

6. The shelter in accordance with claim 1, wherein the enclosure further comprises a pop up structure for the at least one of the side walls or the top wall, with the pop up structure having a hub that is connected to a plurality of rods, with the rods being connected to the panel.

7. The convertible shelter system in accordance with claim 6, wherein the hub is a single hub centrally located relative to the at least one of the side walls or the top wall, with the rods being pivotally connected to the hub and movable to achieve an erected position that places the fabric of the panel in tension.

8. The shelter in accordance with claim 1, wherein the outer layer and the inner layer are constructed of the same material.

9. The shelter in accordance with claim 1, wherein the polyester fabric of at least one of the outer layer or the inner layer further comprises polyester fabric of 300 Denier or greater.

10. The shelter in accordance with claim 1, wherein the poly fill insulation middle layer further comprises synthetic insulation material.

11. The shelter in accordance with claim 1, wherein the polyester fabric of the inner layer and the outer layer further comprise polyester fabric of 300 Denier or greater.

12. The shelter in accordance with claim 1, wherein the poly fill insulation middle layer has a weight of at least 60 grams per meter squared.

13. A method of making a shelter comprising the steps of:
providing a non-metal polyester fabric having a polyurethane coating, being flame resistant, water resistant and defining an outer layer;
providing a non-metal polyester fabric having a polyurethane coating, being flame resistant, water resistant and defining an inner layer;
forming a flame resistant insulated non-quilted non-air permeable fabric by providing and positioning a non-metal poly fill insulation middle layer between and adhesively bonding the insulation middle layer to the outer layer and the inner layer without using a quilted stitching pattern;
forming the flame resistant insulated non-quilted non-air permeable fabric into panels;
forming a plurality of side walls with each having an upper perimeter edge, and a top wall, each of which comprises at least one of the flame resistant insulated non-quilted fabric panels; and
interconnecting at the respective upper perimeter edges the plurality of side walls and the top wall so as to define an enclosure.

14. The method of making a shelter in accordance with claim 13, wherein at least one of the side walls further comprises a doorway.

15. The method of making a shelter in accordance with claim 13, wherein the polyester fabric of the inner layer and the outer layer further comprise polyester fabrics of 300 Denier or greater.

16. The method of making a shelter in accordance with claim 13, wherein the enclosure further comprises an anchor strap further comprising an eyelet for use with a ground engaging anchor in connecting a side wall to a ground surface.

17. The method of making a shelter in accordance with claim 13, further comprising forming a collapsible structure for each side wall and the top wall.

18. The method of making a shelter in accordance with claim 17, wherein the collapsible structure for at least one of the side walls or the top wall further comprises a pop up structure having a hub that is connected to a plurality of rods, with the rods being connected to the fabric panel of the at least one of the side walls or the top wall.

19. The method of making a shelter in accordance with claim 18, wherein the hub is a single hub centrally located relative to the at least one of the side walls or the top wall, with the rods being pivotally connected to the hub and movable to achieve an erected position that places the fabric panel in tension.

* * * * *